(12) United States Patent
Steele

(10) Patent No.: US 8,276,736 B2
(45) Date of Patent: Oct. 2, 2012

(54) CONVEYOR APPARATUS AND SYSTEM FOR MOVING MATERIAL

(75) Inventor: Thomas W. Steele, Twentynine Palms, CA (US)

(73) Assignee: FLSmidth A/S (DK)

( * ) Notice: Subject to any disclaimer, the term of this patent is extended or adjusted under 35 U.S.C. 154(b) by 132 days.

(21) Appl. No.: 12/844,900

(22) Filed: Jul. 28, 2010

(65) Prior Publication Data

US 2012/0024662 A1 Feb. 2, 2012

(51) Int. Cl.
*B65G 41/00* (2006.01)
(52) U.S. Cl. ......................................... 198/303; 198/312
(58) Field of Classification Search .................. 198/300, 198/303, 312, 860.1
See application file for complete search history.

(56) References Cited

U.S. PATENT DOCUMENTS

| | | | |
|---|---|---|---|
| 1,996,488 A | 4/1935 | Phillips | |
| 2,851,150 A | 9/1958 | Boersma | |
| 3,604,757 A | 9/1971 | White | |
| 4,139,087 A | 2/1979 | Westhoff | |
| 5,090,549 A | 2/1992 | Thiel | |
| 5,234,094 A * | 8/1993 | Weyermann et al. | 198/303 |
| 5,562,194 A | 10/1996 | Wüsten | |
| 5,609,397 A | 3/1997 | Marshall | |
| 6,006,894 A * | 12/1999 | Gibbs et al. | 198/303 |
| 6,085,890 A | 7/2000 | Kelly | |
| 6,155,400 A | 12/2000 | Daigh | |
| 6,782,993 B2 | 8/2004 | Bernard | |
| 7,108,124 B2 * | 9/2006 | Bernard et al. | 198/617 |
| 7,191,888 B2 | 3/2007 | Kahrger | |
| 7,284,650 B2 * | 10/2007 | Hoffmann | 198/303 |
| 2001/0001434 A1 | 5/2001 | Daigh et al. | |
| 2003/0136632 A1 | 7/2003 | Bernard et al. | |
| 2007/0102263 A1 | 5/2007 | Hoffmann | |

OTHER PUBLICATIONS

Written Opinion from ISA (PCT/US2011/042496) mailed Dec. 2, 2011.

* cited by examiner

*Primary Examiner* — James R Bidwell
(74) *Attorney, Agent, or Firm* — Jeffrey A. Sharp; Aaron M. Pile; Daniel DeJoseph

(57) ABSTRACT

A conveyor apparatus includes a first conveyor apparatus and a second conveyor apparatus. The first conveyor apparatus is positionable adjacent to a feed conveying device. The first conveyor apparatus is configured to pivot about a position adjacent to the feed conveyor device or move laterally adjacent to the feed conveyor. The second conveyor apparatus is configured to move such that the second conveyor apparatus maintains a position substantially parallel to the first conveyor apparatus when the first conveyor apparatus moves or pivots. In some embodiments, the second conveyor apparatus may also be configured to move along a path so that the second conveyor apparatus is extendable beyond an end of the first conveyor apparatus. The path may be a linear path and may be substantially parallel to the length of the first conveyor apparatus such as a path that extends in a direction that is a few degrees off of being perfectly parallel.

29 Claims, 8 Drawing Sheets

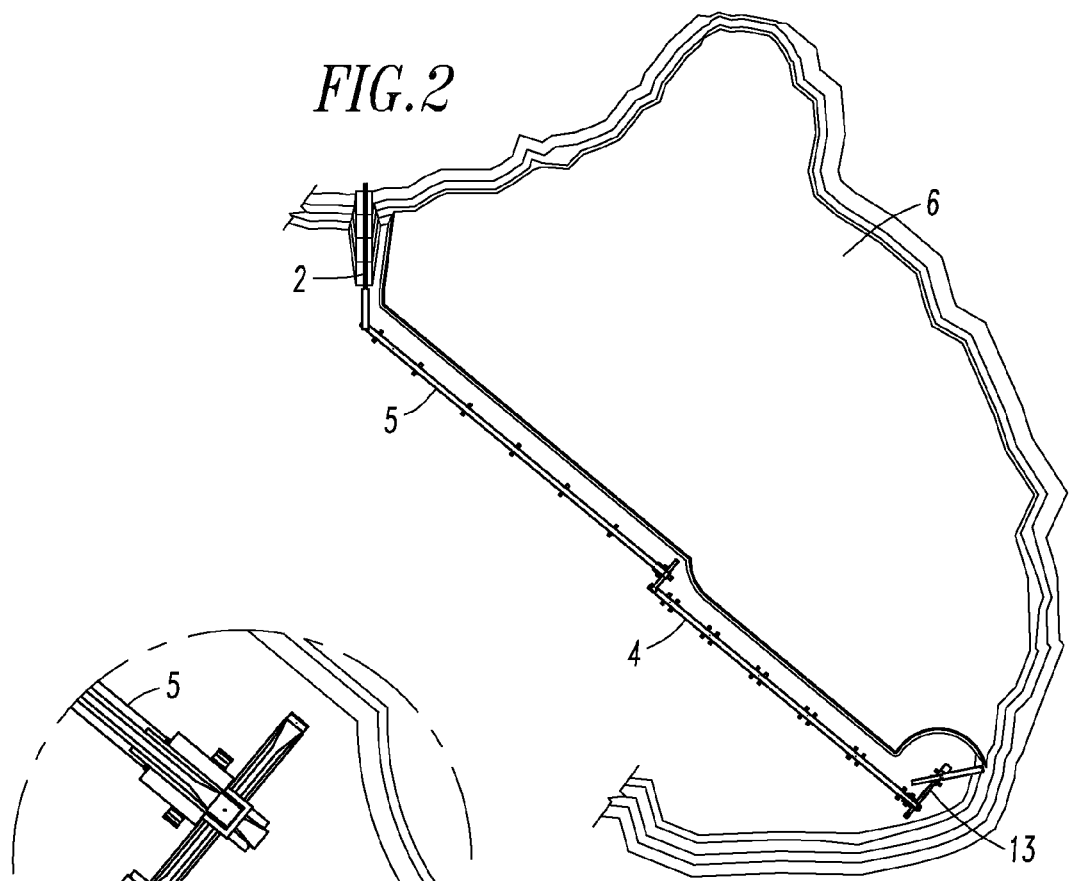
FIG.2
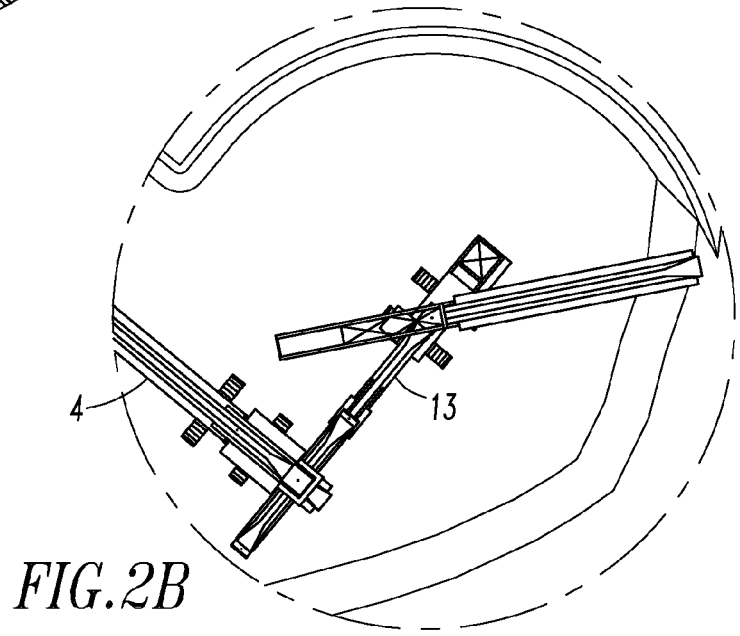
FIG.2A
FIG.2B

CONVEYOR APPARATUS AND SYSTEM FOR MOVING MATERIAL

FIELD OF THE INVENTION

The present invention relates to conveyor apparatuses such as conveyors and conveyor systems configured to stack material in storage areas or reclaim material.

BACKGROUND OF THE INVENTION

Conveyors may be used in systems configured to stack material or receive material from some type of excavator or feeder. Typically, systems designed for stacking material utilize a number of conveyors. One set of conveyors is typically used to convey material to a stacker for stacking in a particular area. Another set of conveyors is used to receive material from an excavator or feeder that is reclaiming the material stacked in that area or providing material extracted from a mine. Examples of systems used to stack material or reclaim material are disclosed in U.S. Pat. Nos. 7,191,888, 6,782,993, 6,155,400, 6,085,890, 5,609,397, 5,562,194, 5,090,549, 4,139,087, 3,604,757, 2,851,150 and 1,996,488, and U.S. Patent Application Publication No. 2007/0102263.

Conveyor systems used to stack material often include a system of conveying devices. For example, overland conveyors are often used to transport material over relatively long distances to different locations. An overland conveyor may be configured to move material from a material receiving location to a material discharge location.

Typically, a multi-section mobile bridge conveyor or other conveyor is positioned adjacent to an overland conveyor. An overland tripper or other device may be configured to feed material from an overland conveyor to the mobile bridge conveyor. The mobile bridge conveyor may stack the material or may move the material to a cross conveyor attached to the mobile bridge conveyor, which may stack material or transfer the material to another conveyor or a stacker for stacking the material.

Often, a mobile bridge conveyor includes and supports a tripper that is interconnected with a cross conveyor. The tripper may lift and discharge material from the mobile bridge conveyor to the cross conveyor. The tripper typically shares a conveyor belt with the mobile bridge conveyor. The tripper usually will not include a belt, but will raise the belt of the bridge conveyor to a point above and adjacent to the cross conveyor for discharging material to the cross conveyor. Typically, the tripper is moveably supported on the mobile bridge conveyor to ensure alignment and proper transport of material to the cross conveyor for stacking the material.

The cross conveyor is typically affixed to the tripper to receive material from the tripper and stack that material adjacent to the mobile bridge conveyor or transfer the material to another conveyor. The mobile bridge conveyor may be used to stack material via the cross conveyor.

A mobile bridge conveyor may also include and support a tripper that does not have a cross conveyor, but is interconnected with another piece of mobile equipment. The tripper may then discharge material directly to that other piece of mobile equipment in the same way that it may discharge material to a cross conveyor.

To stack material in irregular shaped permanent or temporary storage areas or irregular shaped valleys within a storage area, a mobile bridge conveyor may need to be moved multiple times, which can cause significant operation costs to be incurred for each move. Further, such moves of mobile bridge conveyors can cause down time that may significantly affect upstream operations or complicate scheduling associated with the stacking of material.

Conveyor systems used for stacking material may include a system configured for using radial stackers and grasshopper conveyors. The radial stacker in such systems is configured to work in a circular path and often has an extendable conveyor head to increase the time between stack moves. The system is set up at an initial location with the stacker at its initial position. Once the radial stacker completes its first rotation, the head of the stacker may be extended or retracted and the stacker could reverse its path to further stack material. This process may continue until the stacker has stacked a distance equal to the extension/retraction length of the extendable conveyor head. The stacker and single section bridge then may index forwards or backwards to a new location to stack additional material.

Movement to the new location often takes a significant amount of time. For instance, the stacker may need to be moved by a lifting device or by towing the stacker. In this type of system, the stacker tail end is often supported by the head end of a single section bridge conveyor. The single section bridge conveyor either pushes or pulls the stacker depending on whether the stacker is advance or retreat stacking. Grasshopper conveyors may be positioned adjacent to the single section bridge conveyor to transfer material to the single section bridge conveyor feeding the stacker. For advance stacking versions of this system, grasshopper conveyors may be added to the system. For retreat stacking versions of this system, grasshopper conveyors may be removed from such a system. Grasshopper conveyor systems are usually only used for retreat stacking.

As the single section bridge conveyor moves, it travels under the discharge of a unique grasshopper conveyor. Once the bridge conveyor has moved a distance equal to the length of a grasshopper conveyor, the grasshopper conveyor is removed or added for stacking material at another position. Movement of the single section bridge conveyor and stacker when adding or removing a grasshopper conveyor usually requires the system to be shut down. Additionally, movement of the grasshopper conveyors for adding or removing grasshopper conveyors typically requires the system to be shut down. Such shut downs require significant costs to be incurred.

Another example of a conveyor system that may be utilized to stack material includes use of a racetrack system often used for leach pad stacking. A racetrack system is often an on/off leach pad and is often used when there is limited space for a permanent leach pad or where leachate pumping costs are extremely high for a permanent pad. Racetrack systems are often rectangular in shape and there is usually one pad on each side of a conveyor corridor. A racetrack system typically uses a mobile stacking bridge conveyor for stacking material, a mobile receiving conveyor and a bucket wheel excavator for removing the leached material, and a central corridor with a feed overland conveyor and a reclaim overland conveyor. Typically, there is a generally semicircular area at each end of the pads in which a mobile bridge conveyor can rotate from one pad to another. Such systems provide little design flexibility, if any, for permitting stacking that may utilize irregular shaped space in storage areas.

A system for stacking or an apparatus configured for stacking material is needed that provides for the utilization of more space for stacking. Preferably, such a system is configured to permit a storage area to be in any dimension desirable for stacking of material, such as an irregular shaped stacking area that may include a number of hills or valleys.

SUMMARY OF THE INVENTION

A conveying system is provided that includes a feed conveying device, a first conveyor apparatus and a second conveyor apparatus. The first conveyor apparatus is positioned adjacent to the feed conveying device such that the first conveyor apparatus is able to receive material from the feed conveying device. The first conveyor apparatus includes a frame and a tripper device that is moveable along the frame. The second conveyor apparatus is positioned adjacent to the first conveyor apparatus. The second conveyor apparatus includes a frame, a hopper and a moveable tripper device. The frame supports the hopper and the tripper device. The hopper of the second conveyor apparatus is sized and configured to receive material from the tripper device of the first conveyor apparatus and the tripper device of the second conveyor apparatus is sized and configured to stack the material or move material for stacking. The hopper of the second conveyor apparatus may be affixed to the frame or may be attached so that the hopper is moveable along a portion of the frame. The second conveyor apparatus is moveable adjacent to the first conveyor apparatus for receiving material from the tripper device of the first conveyor apparatus to stack the material and also being moveable adjacent to the first conveyor apparatus such that the second conveyor apparatus is able to maintain a position substantially parallel to the first conveyor apparatus when the first conveyor apparatus moves while positioned adjacent to the feed conveying device.

The feed conveyor device may include one or more overland conveyors, one or more overland tripper conveyor devices, or other conveyor devices used to transport material to the first conveyor apparatus.

Preferably, the first conveyor apparatus and the second conveyor apparatus each include one or more tracks attached to their frames. For instance, the first conveyor apparatus may be a single track mobile stacking conveyor and the second conveyor apparatus may be a dual track mobile stacking conveyor. The dual tracks may be pivotally connected to the frame of the second conveyor apparatus. In an alternative embodiment, all the tracks may be affixed so they cannot pivot relative to the frame to which they are attached.

The second conveyor apparatus may be configured to move adjacent to the first conveyor apparatus such that a portion of the second conveyor apparatus extends beyond an end of the first conveyor apparatus. The first conveyor apparatus may have a length that is the longest dimension of the frame of the first conveyor apparatus. The second conveyor apparatus may be moveable adjacent to the first conveyor apparatus such that the second conveyor apparatus is moveable in a direction that is substantially parallel to the length of the first conveyor apparatus or along a path that is substantially parallel to the length of the first conveyor apparatus. The second conveyor apparatus may also be configured so that it may only move to an extended position along such a path when the first conveyor apparatus is in a stationary position.

The position of the second conveyor apparatus that is substantially parallel to the first conveyor apparatus can be a position that orients the second conveyor apparatus such that a longest dimension of the frame of the second conveyor apparatus is parallel or substantially parallel with a longest dimension of the frame of the first conveyor apparatus. It should be understood that a substantially parallel position may be a parallel position or may be a position that is about parallel or appears to be parallel.

The second conveyor apparatus may be configured to move such that the second conveyor apparatus is positioned in a substantially parallel orientation relative to the first conveyor apparatus when the first conveyor apparatus moves about a fixed pivot point location or along a conveyor equipped with a mobile tripper. That substantially parallel orientation may include an orientation that places both conveyor apparatuses in an alignment such that the longest dimension of the frame of the first conveyor apparatus is parallel to the longest dimension of the second conveyor apparatus.

Sensors may be attached to the first conveyor apparatus or the second conveyor apparatus. Some sensors may be attached to the first conveyor apparatus and other sensors may be attached to the second conveyor apparatus. A controller may be attached to the sensors. The controller may be in a remote location or may be attached to one of the conveyor apparatuses. The controller may be configured to adjust movement of at least one of the first conveyor apparatus and the second conveyor apparatus such that the frame of the first conveyor apparatus and the frame of the second conveyor apparatus are separated by at least a predetermined distance. That distance may be, for example, two to five meters or ten meters. Preferably, the distance is set to be sufficient to avoid a collision between the first and second conveyors while they move adjacent to each other.

The hopper of the second conveyor apparatus and the tripper device of the second conveyor apparatus may be separate devices. The hopper and the tripper device of the second conveyor apparatus may be moveable along a path defined by the frame of the second conveyor apparatus such as, for example, rails formed on the frame or rails supported by the frame. The tripper device of the first conveyor apparatus may also be moveable along a path defined by the frame of the first conveyor apparatus. The path may be defined by rails formed on or supported by that frame. The first conveyor apparatus may also include a hopper attached to its frame so that the hopper is moveable along its frame or along a path defined by its frame. Alternatively, the hopper of the first conveyor apparatus may be attached so it is not moveable or is affixed to a particular portion of the frame.

The tripper device of the first conveyor apparatus may include a cross conveyor attached to a catenary support frame. The tripper device of the second conveyor apparatus may also include a cross conveyor attached to a catenary support frame. The catenary support frame of the tripper device of the first conveyor apparatus may be positionable adjacent to a moveable belt supported by the frame of the first conveyor apparatus to lift or raise a portion of that belt. The catenary support frame of the tripper device of the second conveyor apparatus may be positionable adjacent to a moveable belt supported by the frame of the second conveyor apparatus to lift or raise a portion of that belt.

A conveyor apparatus is also provided. The conveyor apparatus may be used in embodiments of the above mentioned conveyor system. The conveyor apparatus includes a first conveyor apparatus and a second conveyor apparatus. The first conveyor apparatus is positionable adjacent to a feed conveying device such that the first conveyor apparatus is able to receive material from a feed conveying device. The first conveyor apparatus is configured to move relative to the feed conveying device. The first conveyor apparatus includes a frame and a tripper device that is moveable along the frame. The second conveyor apparatus is positionable adjacent to the first conveyor apparatus for receiving material from the tripper device of the first conveyor apparatus. The second conveyor apparatus includes a frame, a hopper and a tripper device. The frame of the second conveyor apparatus supports the hopper and the tripper device of the second conveyor apparatus. The hopper of the second conveyor apparatus is sized and configured for receiving material from the tripper device of the first conveyor apparatus and the tripper device of the second conveyor apparatus sized and configured to stack material or move material so that material is transferred to a stacker apparatus. The first conveyor apparatus is configured to pivot about a fixed pivot point adjacent to the feed conveyor device or move laterally along a feed conveyor with a mobile tripper and the second conveyor apparatus is configured to move such that the second conveyor apparatus maintains a position substantially parallel to the first conveyor apparatus when the first conveyor apparatus pivots about the fixed pivot point or moves laterally along a feed conveyor with a tripper.

A conveyor apparatus is also provided that includes a first moveable conveyor apparatus and a second moveable conveyor apparatus. The first moveable conveyor apparatus includes a frame and a tripper device moveable along a path defined by the frame. The frame has a first end and a second end. The first moveable conveyor apparatus may be configured for positioning adjacent to a feed conveying device at a fixed pivot point location adjacent to the first end of the frame such that the first moveable conveyor apparatus is able to receive material from the feed conveying device and is able to rotate about the fixed pivot point location.

The first moveable conveyor apparatus may also be configured for positioning adjacent to a feed conveying device with a tripper that moves along the feed conveyor adjacent to the first end of the frame such that the first moveable conveyor apparatus is able to receive material from the feed conveying device and is able to move laterally along the feed conveyor to multiple different fixed point locations.

The second moveable conveyor apparatus includes a frame, a hopper and a tripper device. The frame of the second conveyor apparatus supports the hopper and the tripper device of the second moveable conveyor apparatus. The hopper of the second moveable conveyor apparatus is sized and configured for receiving material from the tripper device of the first moveable conveyor apparatus. The tripper device of the second moveable conveyor apparatus is sized and configured to move the material.

The second moveable conveyor apparatus is positionable adjacent to the first moveable conveyor apparatus such that the second moveable conveyor apparatus is aligned in a position substantially parallel to the first moveable conveyor apparatus when the first moveable conveyor apparatus moves. The second conveyor apparatus is also moveable such that at least a portion of the second moveable conveyor apparatus is extendable beyond the second end of the first conveyor apparatus along a path that is substantially parallel to a length of the first moveable conveyor apparatus that is the longest dimension defined by the frame of the first moveable conveyor apparatus.

A conveyor apparatus for receiving material or reclaiming material, from an excavator or feeder is also provided. The conveyor apparatus may include a first conveyor apparatus positionable adjacent to a second conveyor apparatus such that the first conveyor apparatus is able to receive material from the second conveyor apparatus. The first conveyor apparatus is configured to move relative to the second conveyor apparatus. The first conveyor apparatus includes a frame and a hopper attached to that frame. The hopper may be moveably attached or may be affixed in only one position.

The conveyor apparatus for receiving material also includes a second conveyor apparatus positionable adjacent to the first conveyor apparatus for feeding material to the hopper of the first conveyor apparatus. The second conveyor apparatus includes a frame, a hopper and a cross conveyor device. The frame of the second conveyor apparatus supports the hopper and the cross conveyor device. The hopper of the second conveyor apparatus sized and configured for receiving material from an excavator or feeder device and may be attached to the frame so it is moveable along a portion of the frame or may be attached so it is not moveable. The cross conveyor device is sized and configured to feed material to the hopper of the first conveyor apparatus.

In some embodiments of the conveying apparatus for reclaiming material, the cross conveyor device of the second conveyor apparatus may be attached to a catenary support frame that is configured to lift a portion of a moveable belt of the second conveyor apparatus for feeding material to the cross conveyor device. For such embodiments, it should be understood that the cross conveyor device and catenary support frame may be interconnected portions of a tripper device.

The first conveyor apparatus may be configured to pivot about a position adjacent to a receiving conveyor device or move laterally adjacent to the receiving conveyor device, and the second conveyor apparatus may be configured to move such that the second conveyor apparatus maintains a position substantially parallel to the first conveyor apparatus when the first conveyor apparatus moves about the position.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred embodiments of apparatuses and systems for stacking and reclaiming material are shown in the accompanying drawings.

FIG. 1A is an enlarged fragmentary top view of the first present preferred embodiment of the conveyor system that has the first and second mobile conveyor apparatuses each in a first position.

FIG. 2 is a top view of the first present preferred embodiment of the conveyor system that has the first and second mobile conveyor apparatuses each in a second position and the second mobile conveyor apparatus in a position so that a portion of the second mobile conveyor apparatus extends beyond an end of the first mobile conveyor apparatus.

FIG. 2A is an enlarged fragmentary top view of the first present preferred embodiment of the conveyor system that has the second mobile conveyor apparatuses and a stacker apparatus each in a second position.

FIG. 2B is an enlarged fragmentary top view of the first present preferred embodiment of the conveyor system that has the second mobile conveyor apparatuses and a stacker apparatus each in a second position.

DETAILED DESCRIPTION OF PRESENT PREFERRED EMBODIMENTS

Figure 1:
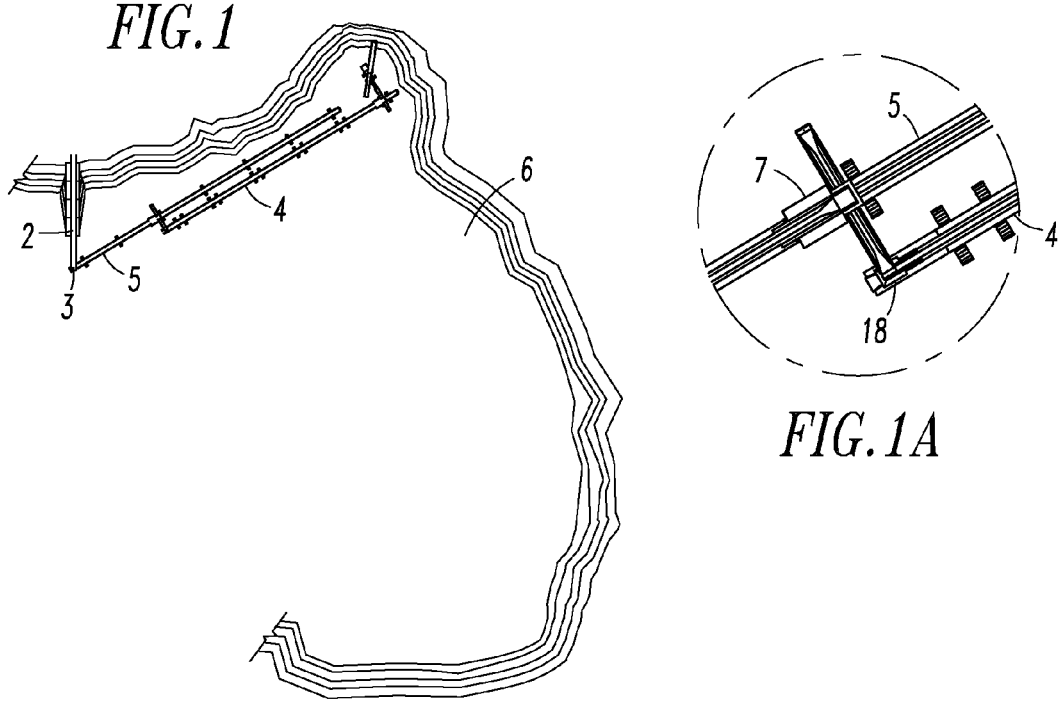
FIG. 1 is a top view of a first present preferred embodiment of a conveyor system that has the first and second mobile conveyor apparatuses each in a first position.
Figure 1B:
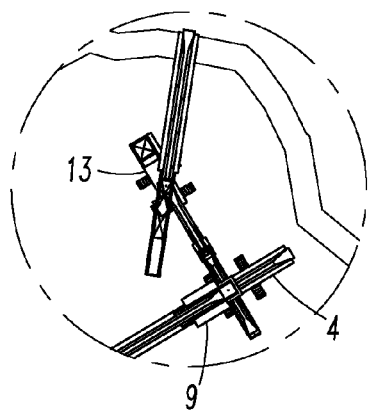
FIG. 1B is an enlarged fragmentary top view of the first present preferred embodiment of the conveyor system that has the second mobile conveyor apparatuses and a stacker apparatus each in a first position.
Figure 1C:
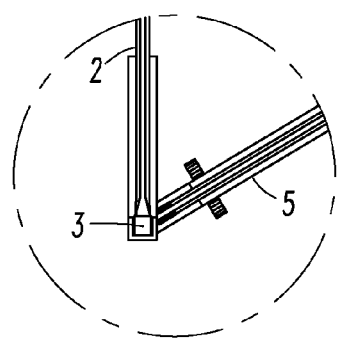
FIG. 1C is an enlarged fragmentary top view of a present preferred embodiment of the conveyor system that utilizes a feed overland conveyor's raised head end to transport material from the feed overland conveyor to a mobile conveyor apparatus.
Figure 1D:
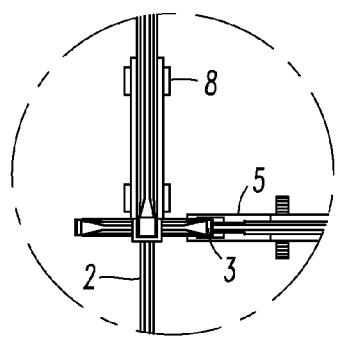
FIG. 1D is an enlarged fragmentary top view of a present preferred embodiment of the conveyor system that utilizes a tripper device to transport material from a feed overland conveyor to a mobile conveyor apparatus.

Referring to FIGS. 1-2B, a conveyor system 1 may include a feed conveyor device 2 that feeds material to a first mobile conveyor apparatus 5 for stacking the material in a storage area 6. The feed conveyor device 2 may include one overland conveyor or multiple overland conveyors. The overland conveyors may be configured to feed the material to a first mobile conveyor apparatus 5, as shown in FIG. 1C. Alternatively, the overland conveyor 2 may feed material to a tripper device 8 for feeding the material to the first mobile conveyor apparatus 5, as shown in FIG. 1D.

The first mobile conveyor apparatus 5 is positioned adjacent to the feed conveyor device 2 at a fixed pivot location 3. One end of the first mobile conveyor apparatus 5 is positioned at or near the fixed pivot location 3. As may be appreciated from FIGS. 1 and 2, the first mobile conveyor apparatus 5 may move about the fixed pivot location 3 such that the end opposite the fixed pivot location 3 of the first conveyor apparatus 5 may rotate or pivot about the fixed pivot location.

It should be understood that the first conveyor apparatus 5 may be moved to a different location for pivoting about a different fixed pivot location adjacent to the feed conveying device 2 to meet other stacking objectives that may arise as stacking within the storage area 6 progresses. For instance, a tripper device 8 as shown in FIG. 1D may be moveable adjacent to feed conveyor 2. The first mobile conveyor apparatus 5 may move with the tripper device 8 or after the tripper device 8 moves to a different location to receive material from the tripper device 8. The first mobile conveyor apparatus may then pivot about the new fixed pivot location 3 located adjacent to the new position the tripper device 8 may be located. In alternative embodiments, the first mobile conveyor apparatus 5 may be moveable adjacent to the tripper device to move laterally with the tripper device 8 and is also pivotable when moved to the fixed pivot location 3.

Preferably, the first mobile conveyor apparatus 5 is a mobile stacking conveyor. The first mobile conveyor apparatus 5 may include a frame that has tracks. The frame may be configured to include an adaptive alignment system as disclosed in U.S. Pat. No. 6,155,400 and may be attached to tracks or dual track undercarriages to permit the first mobile conveyor apparatus to move. The frame may support a moveable belt for conveying material and a tripper device 7 that is moveable along rails supported by the frame adjacent to the moveable belt. The frame may also support a hopper. The hopper may be affixed to a particular portion of the frame or may be moveable along a portion of the frame or along rails supported by the frame. The tripper device 7 preferably has a tripper that is sized and configured to lift a portion of the moveable belt of the first mobile conveyor apparatus 5 so material may be discharged onto a cross conveyor of the tripper device 7.

A second mobile conveyor apparatus 4 is positioned adjacent to the first mobile conveyor apparatus 5. Preferably, the second mobile conveyor apparatus 4 is a mobile stacking conveyor. The second mobile conveyor apparatus can include a frame that has tracks. The frame may be configured to include an adaptive alignment system as disclosed in U.S. Pat. No. 6,155,400. The frame may support a moveable belt, a tripper device 9 and a hopper 18. The frame of the second mobile conveyor apparatus 4 may also include dual track undercarriages, or carbodies, so that the second mobile conveyor apparatus 4 may move in a direction parallel to the first mobile conveyor apparatus 5.

The hopper 18 and tripper device 9 may be moveable along rails supported by the frame adjacent to the top of the frame and adjacent to the moveable belt. The tripper device 9 may include a tripper frame that is configured to lift the moveable belt of the second mobile bridge conveyor 4 so material may be discharged to a cross conveyor of the tripper device 9. The cross conveyor of the tripper device 9 may be shorter in length than the cross conveyor of the tripper device 7.

The second mobile conveyor apparatus 4 may be configured so that the second mobile conveyor apparatus 4 can maintain or automatically maintain an orientation relative to the first mobile conveyor apparatus 5 when the first mobile conveyor apparatus 5 moves about the fixed pivot location 3. For instance, the second mobile conveyor apparatus 4 may move when the first mobile conveyor apparatus 5 moves about the fixed pivot location 3 so that the second mobile conveyor apparatus 4 maintains a position that is parallel or substantially parallel to the first mobile conveyor apparatus 5. In so doing, the second mobile conveyor apparatus 4 may move such that it maintains its orientation relative to the first mobile conveyor apparatus.

For instance, a length defined by the frame of the first mobile conveyor apparatus 5 may be the longest dimension of the frame. The second mobile conveyor apparatus 4 may also have a length that is defined by the frame of the second mobile conveyor apparatus 4 as being the longest dimension of the frame. The movement of the first and second mobile conveyor apparatuses may be configured so that both conveyor apparatuses maintain an orientation that positions the length of the first mobile conveyor apparatus 5 in a position that is substantially parallel to the length of the second mobile conveyor apparatus 4 as the conveyor apparatuses pivot about the fixed pivot location 3 or as one mobile conveyor apparatus may move relative to the other mobile conveyor apparatus.

A stacker device 13 such as a stacker conveyor may also be positioned or arranged to receive material from the cross conveyor of the tripper device 9 of the second conveyor apparatus 4 for stacking material. For example, the stacker device 13 may be positioned adjacent to the second mobile conveyor apparatus 4 to receive the material from a cross conveyor of the tripper device 9 and stack the material in a pile in the storage area 6. The stacker device 13 may move as the first and second mobile conveyor apparatuses move to be repositioned for stacking the material in a new location within the storage area 6. Alternatively, the tripper device 9 may also be configured so the second conveyor apparatus 4 may directly stack material in the storage area 6.

Of course, it is contemplated that the first conveyor apparatus 5 may also be configured such that it may directly stack material in the storage area. For instance, the cross conveyor of the first conveyor apparatus may be configured to stack material to a side of the first conveyor apparatuses.

The stacker device 13 may also receive material from the first mobile conveyor apparatus 5. For instance, the stacker device 13 may be positioned to receive material from the cross conveyor of the tripper device of the first mobile conveyor apparatus 5. Stacking may proceed along the length of the first mobile conveyor apparatus in such a manner. After the stacking reaches a position near the far end of the first mobile conveyor apparatus 5, stacker device 13 may then be moved to receive material adjacent to the second mobile conveyor apparatus 4 to continue stacking operations until a time when pivoting of the first mobile conveyor apparatus 5 or movement of the second conveyor apparatus 4 is commenced for further stacking at different positions.

The material stacked by the stacking system 1 may include for example, ore, minerals, dirt, rock, stone, agglomerated material, or other material. It is contemplated that a bucket wheel reclaimer or other reclaimer device may be utilized to reclaim the material stacked within the storage area 6. Such reclaimer devices may reclaim the material from the storage area 6 using different overland conveyors and may utilize different bridge conveyors. It is also contemplated that one or more of the mobile conveyor apparatuses could be repositioned for reclaiming material from the storage area 6 if necessary or desired.

Figure 3:
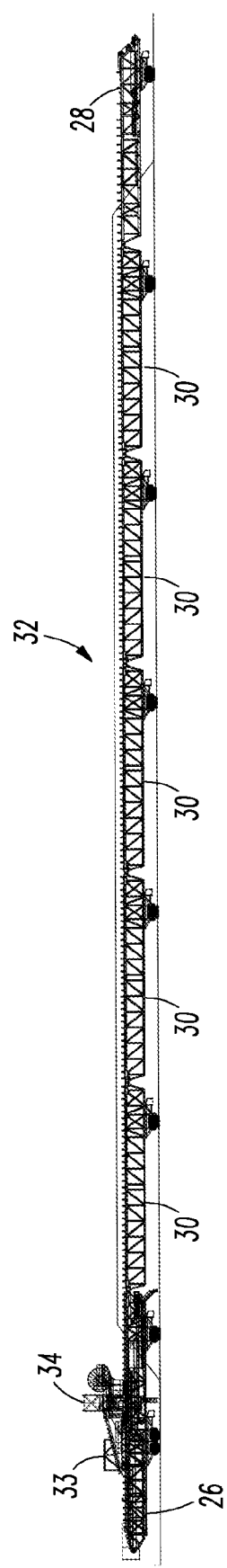
FIG. 3 is a side view of a first present preferred mobile conveyor apparatus that may be used in a present preferred embodiment of the conveyor system.

Referring to FIG. 3, a mobile conveyor apparatus 31 that may be used as a first mobile conveyor apparatus or a second mobile conveyor apparatus in an embodiment of the above described system 1 can include a tripper device 34 that is supported on a frame 32. The frame may include multiple frame portions 30 that are interconnected. The frame 32 supports a moveable belt that may carry material to be stacked. The frame includes a first end 26 and a second end 28. The tripper device 34 may be supported by the frame 32 such that the tripper device is moveable between the first end 26 and the second end 28.

Figure 4A:
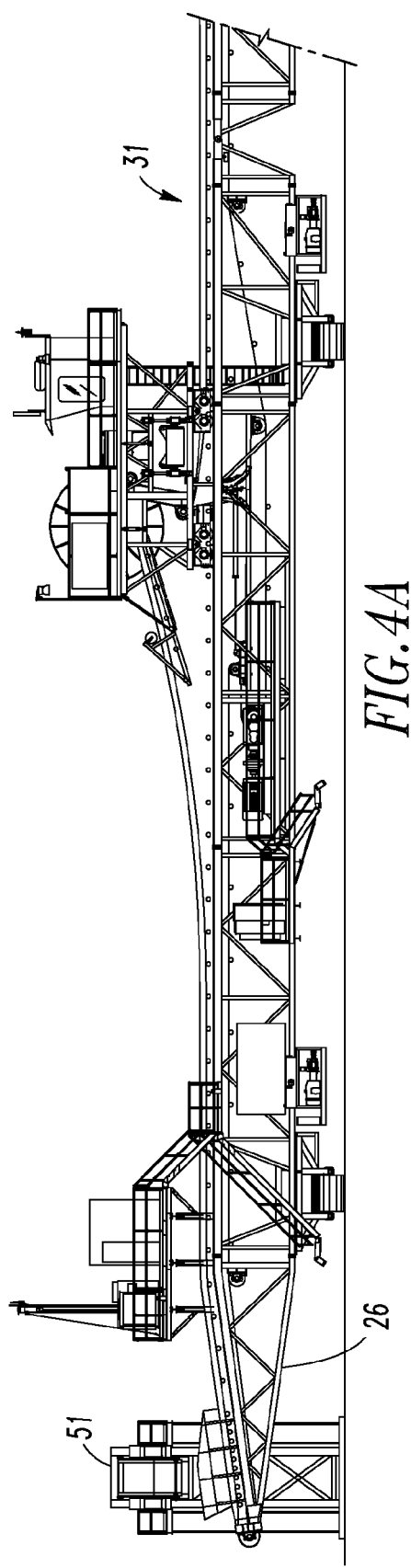
FIG. 4A is a fragmentary side view of the first present preferred mobile conveyor apparatus positioned adjacent to a feed conveyor device in a first arrangement that may be used in a present preferred embodiment of the conveyor system.
Figure 4B:
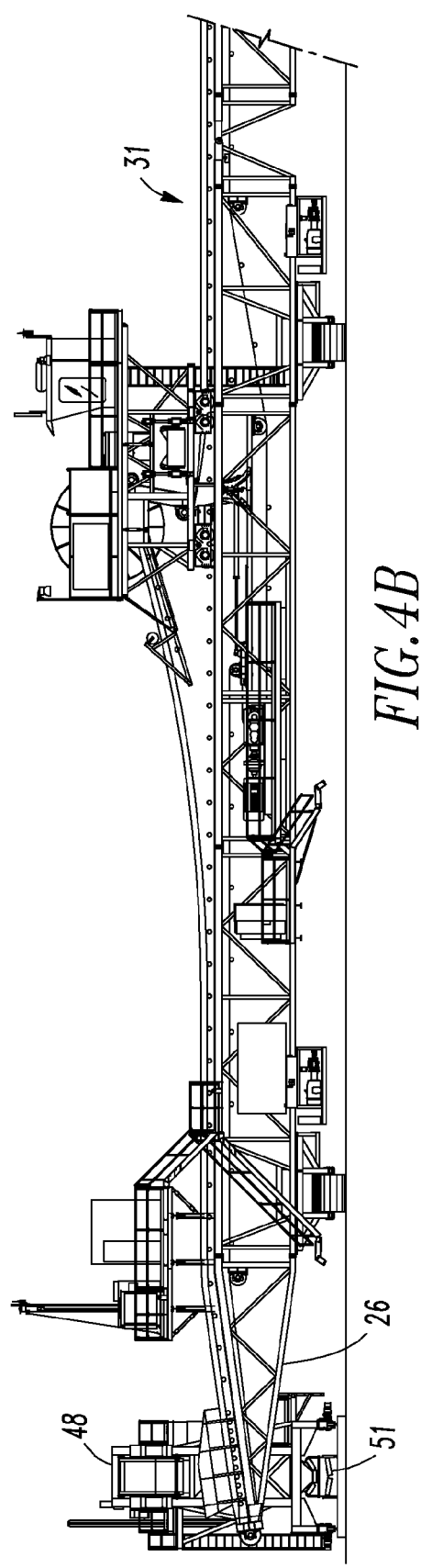
FIG. 4B is a fragmentary side view of the first present preferred mobile conveyor apparatus positioned adjacent to a feed conveyor device in a second arrangement that may be used in a present preferred embodiment of the conveyor system.

If the mobile conveyor apparatus 31 is positioned adjacent to a feed conveyor device 51, such as an overland conveyor, the first end 26 of the mobile conveyor may be positioned adjacent to the feed conveyor device 51 for receiving material from that device, as shown in FIG. 4A. Alternatively, a tripper conveyor device 48 shown in FIG. 4B may be positioned by the mobile conveyor apparatus to feed material to the mobile conveyor apparatus.

Figure 5:
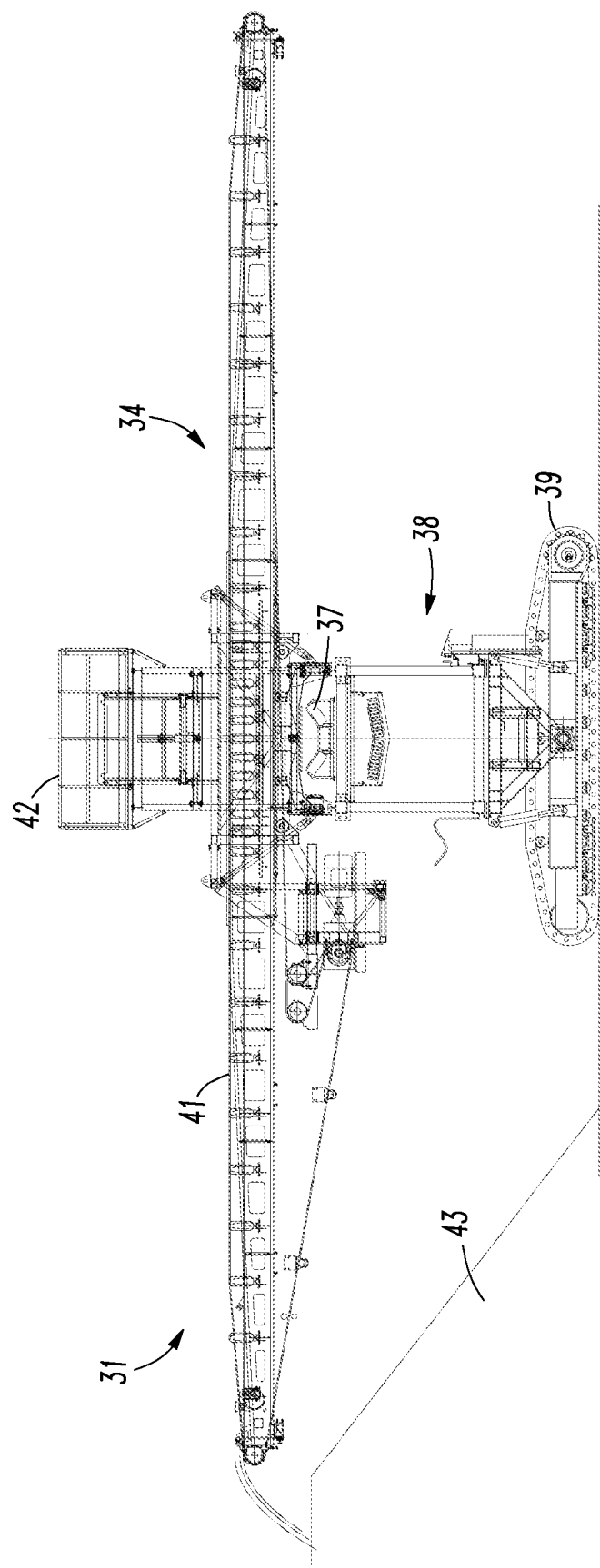
FIG. 5 is an end view of the first present preferred mobile conveyor apparatus that may be used in a present preferred embodiment of the conveyor system.

Referring to FIG. 5, the mobile conveyor apparatus 31 may include a frame that has a base 38 that includes one or more tracks 39 attached to the frame to support the frame. One or more of those tracks 39 may be pivotable to provide improved steering of the mobile conveyor apparatus 31. For instance, the tracks may be dual track undercarriages or carbodies that can be steered. As another example, the tracks 39 may be single tracks that are not steerable because the track suspension is rigidly fixed to the base 38. For mobile conveyor apparatuses that may be a second mobile conveyor apparatus 4 as discussed above, the mobile conveyor apparatus preferably includes a dual track undercarriage or other movement mechanism that permits the mobile conveyor apparatus to move both endwise and in other directions transverse to the length of the conveyor apparatus.

Figure 6:
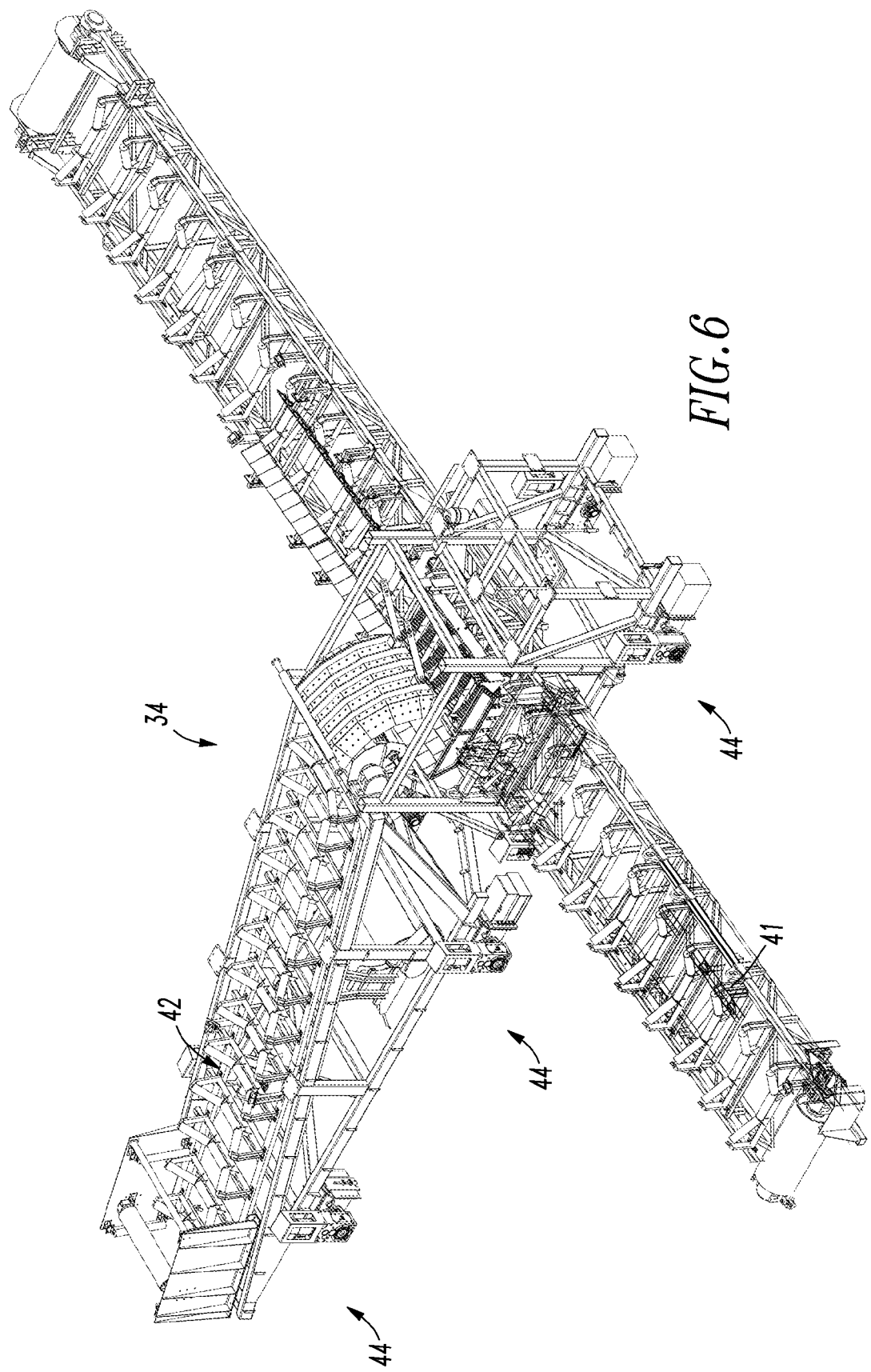
FIG. 6 is a perspective view of a first present preferred tripper device that may be attached to or included in a present preferred mobile conveyor apparatus.

The base 38 of the mobile conveyor apparatus 31 may include the frame and may support a moveable belt such as a continuous belt or conveyor belt. The conveyor belt may be supported by idlers 37 attached to the frame or base of the mobile conveyor apparatus 31. The tripper device may include a catenary support frame 42 and a cross conveyor 41 attached to that catenary support frame 42, as may be seen in FIG. 6. The frame of the tripper device may be attached to wheels 44 for moving along rails positioned on the frame of the mobile conveyor apparatus for moving between the ends of the mobile conveyor apparatus.

The tripper device is positionable adjacent to the moveable belt of the mobile conveyor apparatus so the moveable belt can carry material to the cross conveyor 41 for stacking the material into a pile 43 or feeding another piece of equipment. A hopper or other guide mechanism may be positioned between the cross conveyor 41 and the upper end of the catenary support frame 42 of the tripper device to guide material onto the cross conveyor.

Figure 7:
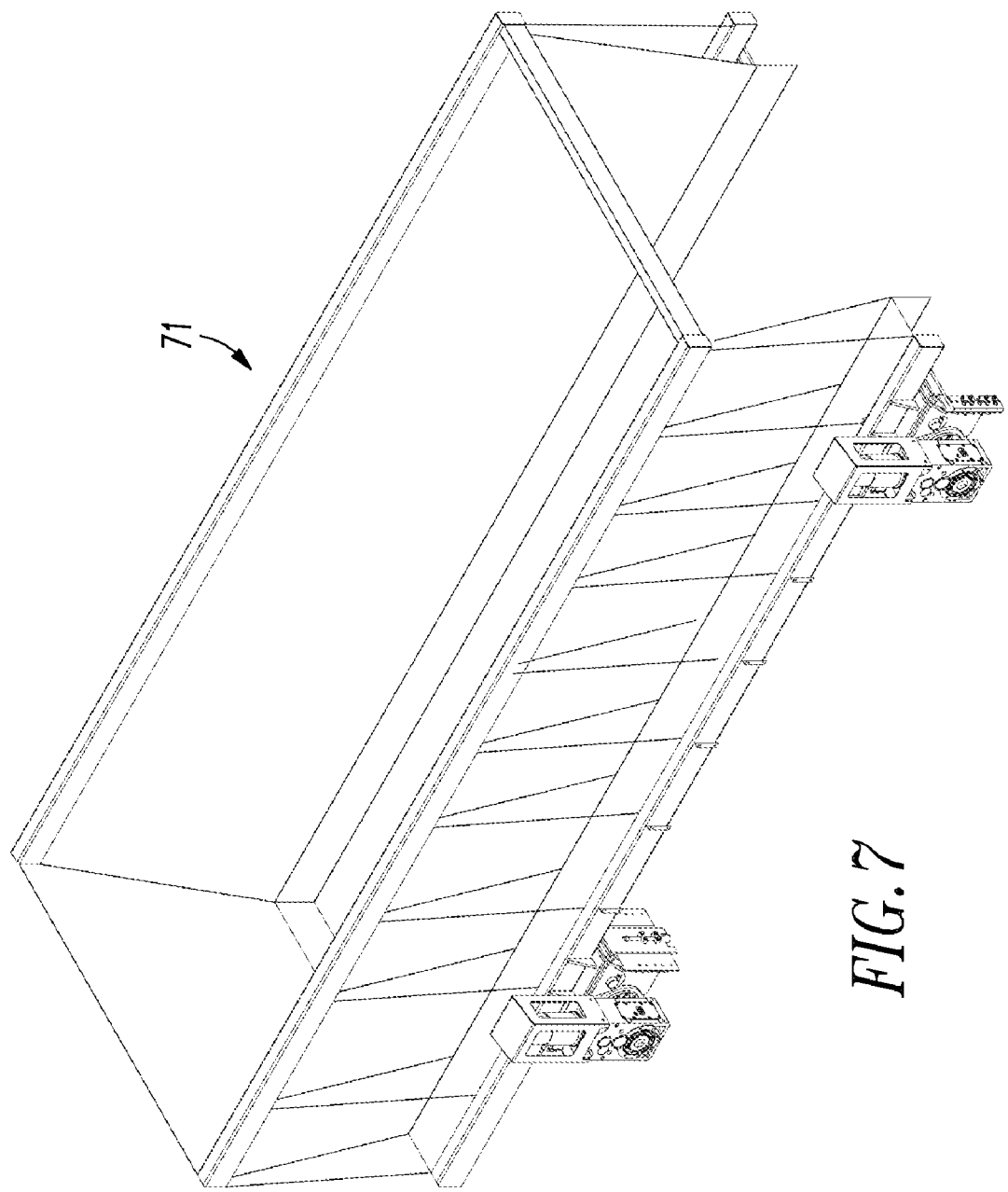
FIG. 7 is a perspective view of a first present preferred hopper that may be attached to or included in a present preferred mobile conveyor apparatus.

Mobile conveyor apparatuses may also include hoppers, such as hopper 71 shown in FIG. 7. The hopper may also include wheels for moving along the rails of a conveyor apparatus. If a conveyor apparatus is receiving material from a tripper for stacking, the conveyor apparatus may include a hopper 71 to help guide the material onto the belt of the conveyor apparatus. Such material may then be fed to a tripper device or to an end of the conveyor apparatus for stacking the material.

For example, the second conveyor apparatus 4 shown in FIGS. 1 and 2 may include a hopper 18 that is positionable for receiving material from the tripper device 7 of the first conveyor apparatus 5. The hopper 18 may be affixed to an end of the second conveyor support apparatus 4 or may be moveable to a plurality of positions along rails similarly to the tripper device 9. If the first conveyor apparatus 5 is receiving material from a tripper device positioned by an overland feed conveyor or other feed conveyor device, the first conveyor apparatus 5 may also have a hopper for receiving the material from that tripper device.

As may be appreciated from FIG. 1 and FIG. 2, the second mobile conveyor apparatus 4 can be configured so that it is able to move relative to the first mobile conveyor apparatus. The second mobile conveyor apparatus 4 can be moveable so that a portion of the second mobile conveyor apparatus 4 can extend beyond the end of the first mobile conveyor apparatus 5. Such movement may occur such that the second mobile conveyor apparatus 4 is parallel or substantially parallel to the first mobile conveyor apparatus 5 when moving along a path generally parallel to the length of the first mobile conveyor apparatus 5 or adjacent to the first mobile conveyor apparatus 5. Such movement preferably occurs such that the first and second mobile conveyor apparatuses are positioned substantially parallel or parallel relative to each other. For instance, a path substantially parallel to the length of another mobile conveyor apparatus may be a path that extends between being perfectly parallel to that length and a path that extends about two or three degrees off of being perfectly parallel to that length.

A controller and one or more sensors may be attached to the first mobile conveyor apparatus 5 or the second mobile conveyor apparatus 4. As another alternative, a controller may be attached to respective mobile conveyor apparatuses or may be positioned in a remote location and connected to each mobile conveyor apparatus to control movement of the mobile conveyor apparatuses. A sensor may be attached to each end of the first mobile conveyor apparatus 5 or both ends of the second mobile conveyor apparatus 4. The controller may include one or more processing units and memory that has software configured to be processed by the one or more processing units. For instance, the controller may be a computer device connected to the first conveyor apparatus 5, a computer device connected to the second conveyor apparatus 4, or a computer device in a remote location that is connected to one or both of the conveyor apparatuses for controlling movement of the conveyor apparatuses.

The software may include a program, software module, or multiple software modules that are configured to adjustably move one or both mobile conveyor apparatuses when it is detected that a mobile conveyor apparatus is moving within a pre-selected distance from a portion of the other mobile conveyor apparatus. The software may also be configured to adjustably move one or both mobile conveyor apparatuses in response to movement of one or more conveyor apparatuses when it is detected that a mobile conveyor apparatus is moving farther than another pre-selected distance from a portion of the other mobile conveyor apparatus. Such a configuration can control movement of the mobile conveyor apparatuses to ensure their alignment stays within a desired tolerance range or the positions of the conveyor apparatuses are maintained in a desired alignment.

For example, if a controller detects that the second mobile conveyor apparatus 4 is moving adjacent to the first mobile conveyor apparatus 5 to extend further beyond the end of the first mobile conveyor apparatus 5 and has moved such that the frame of the second mobile apparatus 4 is positioned within a predetermined distance from the frame of the first mobile conveyor apparatus 5 based on data received from one or more sensors, the controller may cause the second mobile conveyor apparatus 4 to move in a direction away from the frame of the first mobile conveyor apparatus 5 to avoid a collision between the mobile conveyor apparatuses. Such movement can help keep the mobile conveyor apparatuses in a desirable alignment, such as a substantially parallel alignment or a parallel alignment. Such movement may be caused, for example, by driving certain tracks of a mobile conveyor apparatus or may be caused by slightly pivoting one or more tracks if pivotable tracks are attached to the frame of those apparatuses.

Additionally, or as an alternative, the controller and sensors may be configured to cause the first conveyor apparatus 5 to move to adjust the position of the first conveyor apparatus 5 when it is sensed or determined that a portion of the second conveyor apparatus 4 is too close or too far away from the stacker device 13 in FIGS. 1 and 2.

Preferably, the sensors are global positioning sensors (GPS) sensors. However, the sensors may include other types of location sensors or may be distance measuring sensors or other detectors. The sensors may be connected to the one or more controllers via a wireless connection or some connection mechanism permitting the sensors to transmit data to the one or more controllers.

A controller may be configured to control movement of both mobile conveyor apparatuses. The controller may also be configured to control movement by slaving movement of one mobile conveyor apparatus to the position of another mobile conveyor apparatus. For instance, if a controller is configured to slave the position of the first conveyor apparatus 5 to the position of the second conveyor apparatus 4, the controller may be configured such that when the controller determines that the position of the first conveyor apparatus 5 needs to be adjusted farther from the second mobile conveyor apparatus 4, the controller may cause the first conveyor apparatus 5 to move away from the second mobile conveyor apparatus 4 as it moves. The controller may also cause the first conveyor apparatus 5 to move so that the first conveyor apparatus 5 moves parallel to the second mobile conveyor apparatus 4. The controller may also permit the first conveyor apparatus 5 and the second mobile conveyor apparatus to move in the same direction such that the first and second conveyor apparatuses maintain the same orientation relative to each other.

Of course, the controller may alternatively be configured to slave the position of the second conveyor apparatus 4 to the position of the first conveyor apparatus 5 and cause the second mobile conveyor apparatus 4 to move farther away from the first mobile conveyor apparatus 5 upon determining that the mobile conveyor apparatuses are within a predetermined distances from the first mobile conveyor apparatus 5. Such movement may also be controlled such that the second mobile conveyor apparatus 4 moves parallel to the first conveyor apparatus 5. The controller may also permit the first conveyor apparatus 5 and the second mobile conveyor apparatus 4 to move in the same direction such that the first and second conveyor apparatuses maintain the same orientation relative to each other.

The controller for one or more mobile conveyor apparatuses may also be configured so that movement of the mobile conveyor apparatuses ensures that the mobile conveyor apparatuses stay positioned sufficiently close to each other. For example, in addition to avoiding a collision or ensuring that the mobile conveyor apparatuses stay sufficiently spaced apart, the controller or controllers may be configured to cause the mobile conveyor apparatuses to move closer together if the controller determines that one mobile conveyor apparatus is farther than a predetermined distance from the other mobile conveyor apparatus. The controller or controllers may be configured to cause one mobile conveyor apparatus to move or both to move to adjust the position of the two conveyor apparatuses.

The controller may include a processing unit and memory that has software run by the processing unit. The software may be configured to determine when a conveyor apparatus is positioned beyond a predefined allowable distance from the other conveyor apparatus and cause one or both of the devices to move to adjust the position of the devices to within a predefined tolerable position.

A predefined distance may be measured from a GPS sensor located on a mobile conveyor apparatus or the controller may be configured to measure the predefined distance based on a center line or other position that is determined based on the location of different sensors located on one mobile conveyor apparatus or both mobile conveyor apparatuses. For instance, a GPS sensor on each end of a mobile conveyor apparatus may define two end points of a line that is determined by the controller. When an end of a conveyor apparatus is determined to be a predefined distance from this line via a GPS sensor attached to that end of the conveyor apparatus, the controller may be configured to cause the conveyor apparatus to move to readjust its position relative to the other mobile conveyor apparatus. The distance may be measured as a straight line distance from the line or may be measured as a distance relative to a centered mid point or non-centered mid point of the line.

Of course, each mobile conveyor apparatus may also include sensors positioned on their tripper devices or other mechanisms so that the controller may also be configured to control the position of those devices or of the mobile conveyor apparatuses based on data received from those sensors. For example, sensors may be positioned on the cross conveyors of each tripper device to control the spacing between the mobile conveyor apparatuses so that they are sufficiently spaced apart to avoid a collision between the cross conveyors of the mobile conveyor apparatuses' tripper devices.

The controller may also be configured to cause the tripper device of a conveyor apparatus to move while a conveyor apparatus is moving. Such movement may occur while material is being stacked. For instance, movement or repositioning of the second conveyor apparatus 4 may cause the controller to cause the tripper device of the first conveyor apparatus to move to ensure the material being stacked is able to be properly fed to the other mobile conveyor apparatus.

The controller may also be configured to adjust from a first configuration to a second configuration. For example, the controller may be configured to adjust from a configuration in which the conveyor apparatuses positions are slaved to the first mobile conveyor apparatus 5 to a configuration in which the positions of the mobile conveyor apparatuses are slaved to the position of the second conveyor apparatus 4. As another example, the controller may be configured to adjust from one or more configurations that slave the position of one mobile conveyor apparatus to another conveyor apparatus to a configuration that does not slave any position of any device to any other device. A button or actuator may be connected to the controller such that an operator may manipulate the button or actuator to adjust the configuration of the controller. A key pad, keyboard, scanner, input device, or other actuation mechanism may be connected to the controller such that the operator can also provide other input to the controller. A display device, speaker, or other output device may also be connected to the controller such that the controller can transmit output to the display device or other output device for communicating the output to an operator.

Figure 8:
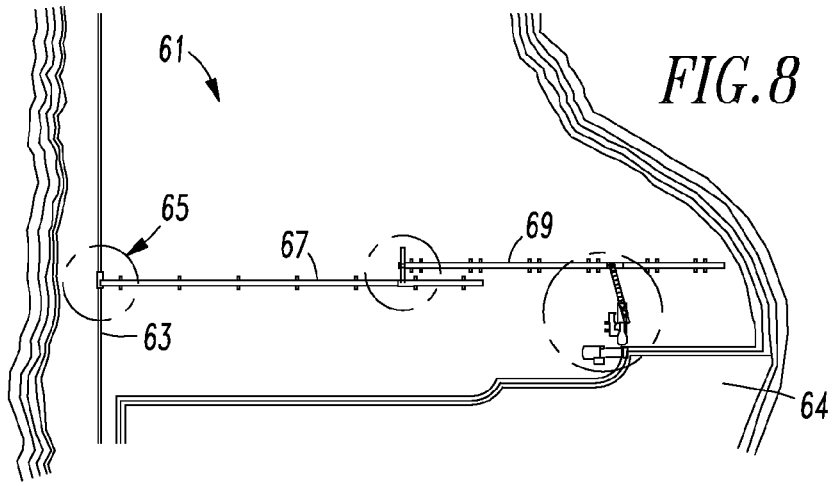
FIG. 8 is a top view of a second present preferred embodiment of a conveyor system that has the first and second mobile conveyor apparatuses each in a first position.
Figure 8A:
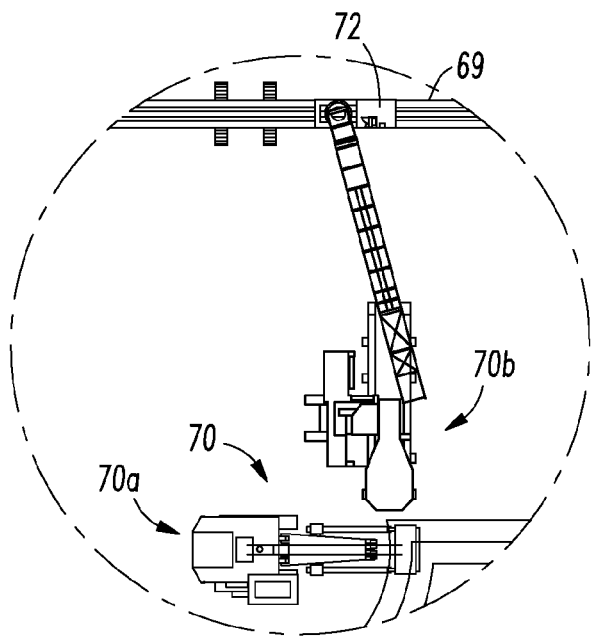
FIG. 8A is an enlarged fragmentary top view of the second present preferred embodiment of the conveyor system illustrating a reclaimer device positioned for feeding material to a conveyor apparatus for reclaiming the material from a pile in storage area.
Figure 8B:
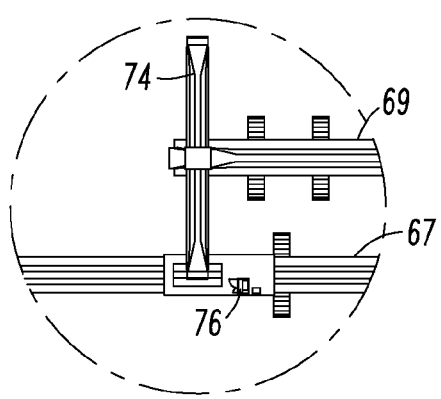
FIG. 8B is an enlarged fragmentary top view of the second present preferred embodiment of the conveyor system illustrating a cross conveyor of the second conveyor apparatus positioned to feed material to the first conveyor apparatus.
Figure 8C:
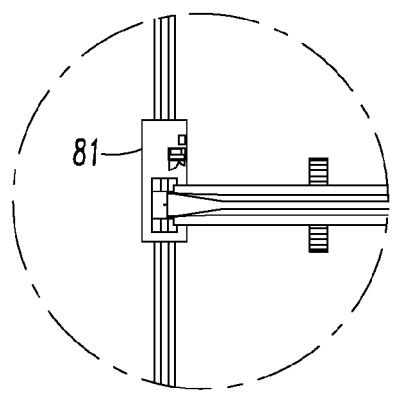
FIG. 8C is an enlarged fragmentary top view of the second present preferred embodiment of the conveyor system illustrating a hopper of a receiving conveyor positioned to receive material from the first conveyor apparatus.

Referring to FIGS. 8-8C, a system 61 for reclaiming material may also be provided by embodiments of the conveyor apparatus. The system 61 includes a receiving conveyor 63 that is adjacent to a first conveyor apparatus 67. The receiving conveyor 63 may transport material to feed material to another device or location.

The first conveyor apparatus 67 and second conveyor apparatus 69 may be positioned in a storage area 64. The first conveyor apparatus 67 may be a mobile reclaiming conveyor and the second conveyor apparatus 69 may be a mobile reclaiming conveyor. The storage area may have a pile of material positioned therein.

The first conveyor apparatus 67 is configured to feed material to the receiving conveyor 63. To do this, the first conveyor apparatus 67 may feed material to a tripper conveyor device for feeding material to the receiving conveyor 63 or may directly feed the material to the receiving conveyor 63 via a hopper 81 attached or moveably attached to the receiving conveyor 63.

The first conveyor apparatus 67 may include a hopper 76 attached to the frame of the first conveyor apparatus 67. The hopper 76 may be attached so it is affixed at a particular location or may be moveable along a portion of the frame.

A second conveyor apparatus 69 is positioned adjacent to the first conveyor apparatus 67. The second conveyor apparatus 69 is moveable so that the second conveyor apparatus may move lengthwise relative to the first conveyor apparatus 67. A portion of the second conveyor apparatus may extend beyond the end of the first conveyor apparatus 67 along a path that is substantially parallel to the length of the first conveyor apparatus 67 as a result of the movement by the second conveyor apparatus.

The second conveyor apparatus 69 may include a hopper 72 attached to the second conveyor apparatus. The hopper 72 may be moveable along a portion of the frame or may be affixed to the frame so it is kept in only one position. The hopper 72 is sized and configured to receive material from a reclaiming apparatus 70. The reclaiming apparatus 70 may include a reclaimer device 70a such as a bucket wheel reclaimer or a shovel. The reclaiming apparatus 70 may also include a mobile bridge conveyor or a mobile sizer 70b positioned between the reclaimer device 70a and the hopper 72 for feeding the reclaimed material to the hopper 72.

The second conveyor apparatus 69 may also include a cross conveyor 74 supported by the frame of the second conveyor apparatus 69. The cross conveyor 74 may be attached to a tripper device or may be directly affixed to the frame of the second conveyor apparatus. The cross conveyor is sized and configured to feed material to a hopper 76 of the first conveyor apparatus 67

During reclaiming of material, the reclaiming apparatus 70 may move material from a pile to the second conveyor apparatus 69 via the hopper 72 of the second conveyor apparatus 69. That material will then be moved via the moveable belt of the second conveyor apparatus 69 to the cross conveyor 74. The cross conveyor 74 may be attached to a tripper device for receiving the material via the moveable belt or may be positioned on the frame of the second conveyor apparatus so that material from the moveable belt is fed to the cross conveyor 74. The cross conveyor 74 moves the material via its moveable belt to the hopper 76 of the first conveyor apparatus 67 to feed material to the first conveyor apparatus 67. The first conveyor apparatus 67 then transports that material to the receiving conveyor 63. The material may be fed via the moveable belt of the first conveyor apparatus 67 or may be fed by another mechanism positioned adjacent to the frame of the first conveyor apparatus 67 for transporting the material to the receiving conveyor 63.

The first conveyor apparatus 67 may be configured to pivot about a pivot location 65 located adjacent to the receiving conveyor 63. The second conveyor may be configured to move so that it maintains its orientation and position relative to the first conveyor apparatus 67 when the first conveyor apparatus 67 moves about the pivot location 65.

It should be understood that movement of the first and second conveyor apparatuses 67 and 69 may be automated, overseen or controlled via the embodiments of the controllers and sensors discussed above with reference to the conveyor apparatuses shown in FIGS. 1-2B.

As the pile of the material is reclaimed, the reclaimer device 70a and the mobile sizer 70b may be repositioned. While the reclaimer apparatus 70a is being repositioned or after it is repositioned, the first and second conveyor apparatuses 67 and 69 may be moved so that the second conveyor apparatus 69 is able to receive material from the reclaiming apparatus 70 via the hopper 72.

It is also possible that the reclaiming apparatus 70 would be moved adjacent to the first conveyor apparatus 67 for directly feeding material to the first conveyor apparatus 67 via the hopper 76 of the first conveyor apparatus 67.

It should be appreciated that variations to the embodiments discussed above may be made. For instance, different reclamation devices, which may include bridge conveyors and reclaimers, may be utilized during reclaiming operations to feed material to the second conveyor apparatus. As another example, different stacking conveyor devices and bridge conveyors may be utilized for receiving material from the second conveyor apparatus for stacking operations.

While certain present preferred embodiments of the conveying system and conveyor apparatus and methods of making and using the same have been shown and described above, it is to be distinctly understood that the invention is not limited thereto but may be otherwise variously embodied and practiced within the scope of the following claims.

What is claimed is:

1. A conveyor system comprising:
a feed conveying device;
a first conveyor apparatus positioned adjacent to the feed conveying device such that the first conveyor apparatus is able to receive material from the feed conveying device, the first conveyor apparatus configured to move relative to the feed conveying device, the first conveyor apparatus comprising a frame and a tripper device moveable along the frame; and
a second conveyor apparatus positioned adjacent to the first conveyor apparatus, the second conveyor apparatus comprising a frame, a hopper and a tripper device, the frame supporting the hopper and the tripper device, the hopper of the second conveyor apparatus sized and configured for receiving material from the tripper device of the first conveyor apparatus and the tripper device of the second conveyor apparatus sized and configured to stack the material or move material for stacking;
wherein during operation, the second conveyor apparatus moves relative to the first conveyor apparatus and receives material from the tripper device of the first conveyor apparatus to stack the material, and also moves relative to the first conveyor apparatus such that the second conveyor apparatus maintains a position substantially parallel to the first conveyor apparatus while the first conveyor apparatus, which is positioned adjacent to the feed conveyor device, moves relative to the feed conveyor device.

2. The conveyor system of claim 1 wherein the feed conveyor device is comprised of at least one overland conveyor.

3. The conveyor system of claim 1 wherein the first conveyor apparatus is comprised of at least one track attached to the frame of the first conveyor apparatus and the second conveyor apparatus is comprised of at least two tracks pivotally attached to the frame of the second conveyor apparatus.

4. The conveyor system of claim 1 wherein the second conveyor apparatus is configured to move adjacent to the first conveyor apparatus such that a portion of the second conveyor apparatus extends beyond an end of the first conveyor apparatus.

5. The conveyor system of claim 1 wherein the position substantially parallel to the first conveyor apparatus is a position that orients the second conveyor apparatus such that a longest dimension of the frame of the second conveyor apparatus is parallel with a longest dimension of the frame of the first conveyor apparatus or the longest dimension of the frame of the second conveyor apparatus extends in a direction that is within three degrees of being parallel with the longest dimension of the frame of the first conveyor apparatus.

6. The conveyor system of claim 1 wherein the second conveyor apparatus is moveable along at least one path that is substantially parallel to a length of the first conveyor apparatus such that an end of the second conveyor apparatus extends beyond the first conveyor apparatus when moved along at least a portion of the path.

7. The conveyor system of claim 1 wherein the tripper device of the second conveyor apparatus is comprised of a catenary support frame attached to a cross conveyor.

8. The conveyor system of claim 1 wherein the first conveyor apparatus is comprised of a moveable belt supported by the frame and the tripper device of the first conveyor apparatus is comprised of a catenary support frame attached to a cross conveyor, the catenary support frame positionable adjacent to the moveable belt to lift the moveable belt.

9. The conveyor system of claim 8 wherein the tripper device of the second conveyor apparatus is comprised of a catenary support frame positionable adjacent to a moveable belt supported by the frame of the second conveyor apparatus to lift the moveable belt, the catenary support frame of the second conveyor apparatus attached to a cross conveyor.

10. The conveyor system of claim 1 wherein the first conveyor apparatus has a first end and a second end, the first end being positioned adjacent to the feed conveyor device such that the first conveyor apparatus is pivotable relative to the feed conveyor device.

11. The conveyor system of claim 1 wherein the first conveyor apparatus has a length and the second conveyor apparatus is moveable adjacent to the first conveyor apparatus such that the second conveyor apparatus is moveable in a direction that is substantially parallel to the length of the first conveyor apparatus.

12. The conveyor system of claim 1 wherein at least one of the first conveyor apparatus and the second conveyor apparatus is further comprised of a controller and a plurality of sensors, each sensor attached to one of the frame of the first conveyor apparatus and the frame of the second conveyor apparatus, the controller connected to the sensors, the controller configured to adjust movement of at least one of the first conveyor apparatus and the second conveyor apparatus such that the frame of the first conveyor apparatus and the frame of the second conveyor apparatus are separated by at least a predetermined distance.

13. The conveyor system of claim 1 wherein the first conveyor apparatus has a first end and a second end, the first end of the first conveyor apparatus connected to the feed conveyor device at a fixed pivot location such that the first conveyor apparatus is moveable so that the second end of the first conveyor apparatus is rotatable about the fixed pivot location.

14. The conveyor system of claim 13 wherein the second conveyor apparatus is configured to move such that the second conveyor apparatus is positioned in a substantially parallel orientation relative to the first conveyor apparatus when the first conveyor apparatus moves about the fixed pivot point location.

15. An apparatus for conveying material for stacking the material in a storage area comprising:
a first conveyor apparatus positionable adjacent to a feed conveying device such that the first conveyor apparatus is able to receive material from the feed conveying device, the first conveyor apparatus configured to move relative to the feed conveying device, the first conveyor apparatus comprising a frame and a tripper device moveable along a portion of the frame; and
a second conveyor apparatus positionable adjacent to the first conveyor apparatus for receiving material from the tripper device of the first conveyor apparatus, the second conveyor apparatus comprising a frame and a hopper, the frame of the second conveyor apparatus supporting the hopper, the hopper of the second conveyor apparatus sized and configured for receiving material from the tripper device of the first conveyor apparatus;
wherein the first conveyor apparatus is configured to pivot about a fixed pivot point adjacent to the feed conveyor device, and the second conveyor apparatus is configured to move relative to the first conveyor apparatus such that the second conveyor apparatus maintains a position substantially parallel to the first conveyor apparatus while the first conveyor apparatus moves about the fixed pivot point.

16. The apparatus of claim 15 wherein the second conveyor apparatus is further comprised of a tripper device supported on the frame of the second conveyor apparatus such that the tripper device is moveable along a portion of the frame of the second conveyor apparatus.

17. The apparatus of claim 16 wherein at least one of the first conveyor apparatus and the second conveyor apparatus is further comprised of a controller and a plurality of sensors, each sensor attached to one of the first conveyor apparatus and the second conveyor apparatus, the controller connected to the sensors, the controller configured to adjust movement of at least one of the first conveyor apparatus and the second conveyor apparatus so the frame of the first conveyor apparatus and the frame of the second conveyor apparatus are separated by at least a predetermined distance.

18. The apparatus of claim 17 wherein the first conveyor apparatus is a tracked mobile stacking conveyor and the second conveyor apparatus is a pivotable dual tracked mobile stacking conveyor.

19. The apparatus of claim 18 wherein the sensors are comprised of sensors attached to the second conveyor apparatus and sensors attached to the first conveyor apparatus.

20. The apparatus of claim 16 wherein the first conveyor apparatus is comprised of a moveable belt supported by the frame and the tripper device of the first conveyor apparatus is comprised of a catenary support frame attached to a cross conveyor, the catenary support frame positionable adjacent to the moveable belt to lift the moveable belt.

21. The apparatus of claim 20 wherein the tripper device of the second conveyor apparatus is comprised of a catenary support frame positionable adjacent to a moveable belt supported by the frame of the second conveyor apparatus to lift the moveable belt, the catenary support frame of the second conveyor apparatus attached to a cross conveyor.

22. The apparatus of claim 15 wherein the fixed pivot point is a first fixed pivot point and wherein the feed conveying device is a tripper conveyor device positioned adjacent to an overland feed conveyor that is moveable from a first position to a second position and wherein the first and second conveyor apparatuses are moveable to align with the feed conveying device so that when the feed conveying device is moved to the second position the first conveyor apparatus is moved to a second location adjacent to the feed conveying device and the second conveyor apparatus maintains a position substantially parallel to the first conveyor apparatus when the first conveyor apparatus moves to the second location.

23. The apparatus of claim 15 wherein the second moveable conveyor apparatus is positionable adjacent to the first moveable conveyor apparatus such that the second moveable conveyor apparatus is aligned in a position substantially parallel to the first moveable conveyor apparatus when the first moveable conveyor apparatus moves and is also moveable such that at least a portion of the second moveable conveyor is extendable beyond an end of the first moveable conveyor apparatus along a path that is substantially parallel to a length of the first moveable conveyor apparatus, the length of the first moveable conveyor apparatus being the longest dimension defined by the frame of the first moveable conveyor apparatus.

24. The apparatus of claim 23 wherein the first moveable conveyor apparatus is comprised of a moveable belt supported by the frame and the tripper device of the first moveable conveyor apparatus is comprised of a frame attached to a cross conveyor, the frame of the tripper device of the first moveable conveyor apparatus positionable adjacent to the moveable belt to lift the moveable belt; and the tripper device of the second moveable conveyor apparatus comprising a frame positionable adjacent to a moveable belt supported by the frame of the second conveyor apparatus to lift the moveable belt, the frame of the tripper device of the second conveyor apparatus attached to a cross conveyor, the tripper device of the second moveable conveyor apparatus being moveable along a path defined by a portion of the frame of the second moveable conveyor apparatus.

25. An apparatus for reclaiming material comprising:
a first conveyor apparatus positionable adjacent to a receiving conveying device such that the first conveyor apparatus is able to feed material to the receiving conveying device, the first conveyor apparatus configured to move relative to the receiving conveying device, the first conveyor apparatus comprising a frame and a hopper; and
a second conveyor apparatus positionable adjacent to the first conveyor apparatus for feeding material to the hopper of the first conveyor apparatus, the second conveyor apparatus comprising a frame, a hopper and a cross conveyor device, the frame of the second conveyor apparatus supporting the hopper and the cross conveyor device, the hopper of the second conveyor apparatus sized and configured for receiving material from a reclaim device, the cross conveyor of the second conveyor apparatus is sized and configured to feed material to the hopper of the first conveyor apparatus; and
the first conveyor apparatus configured to pivot about a position adjacent to the receiving conveyor device and the second conveyor apparatus configured to move such that the second conveyor apparatus maintains a position substantially parallel to the first conveyor apparatus while the first conveyor apparatus pivots.

26. The apparatus of claim 25 wherein the second conveyor apparatus is comprised of a tripper device attached to the cross conveyor device of the second conveyor apparatus and wherein the receiving conveying device supports a moveable hopper that is sized and configured to receive material from the first conveyor apparatus.

27. The apparatus of claim 25 wherein the second conveyor apparatus is positionable adjacent to the first conveyor apparatus such that the second moveable apparatus is aligned in a position substantially parallel to the first conveyor apparatus when the first conveyor apparatus pivots and is also moveable such that at least a portion of the second conveyor is extendable beyond an end of the first conveyor apparatus along a path that is substantially parallel to a length of the first conveyor apparatus, the length of the first conveyor apparatus being the longest dimension defined by the frame of the first conveyor apparatus.

28. The apparatus of claim 25 further comprising a controller connected to at least one of the first conveyor apparatus and the second conveyor apparatus and a plurality of sensors, each sensor attached to one of the first conveyor apparatus and the second conveyor apparatus, the controller connected to the sensors, the controller configured to adjust movement of at least one of the first conveyor apparatus and the second conveyor apparatus so the frame of the first conveyor apparatus and the frame of the second conveyor apparatus are separated by at least a predetermined distance.

29. The apparatus of claim 28 wherein the position adjacent to the receiving conveyor device is a fixed pivot location and wherein the sensors are comprised of sensors attached to the second conveyor apparatus and sensors attached to the first conveyor apparatus.

* * * * *